United States Patent [19]

Weiss et al.

[11] Patent Number: 5,143,872
[45] Date of Patent: Sep. 1, 1992

[54] METHOD OF REGENERATING INACTIVE AND POISONED PLATINUM CATALYSTS

[75] Inventors: Franz-Josef Weiss, Neuhofen; Hugo Fuchs, Ludwigshafen, both of Fed. Rep. of Germany

[73] Assignee: BASF Aktiengesellschaft, Ludwigshafen, Fed. Rep. of Germany

[21] Appl. No.: 730,757

[22] Filed: Jul. 16, 1991

[30] Foreign Application Priority Data

Jul. 18, 1990 [DE] Fed. Rep. of Germany ....... 4022852

[51] Int. Cl.$^5$ .................. B01J 23/96; B01J 38/64; L01B 21/20
[52] U.S. Cl. .................... 502/25; 423/387; 502/27
[58] Field of Search .................. 502/25, 26; 423/387

[56] References Cited

U.S. PATENT DOCUMENTS

| 3,060,133 | 10/1962 | Jocker et al. | 502/339 |
| 3,214,385 | 10/1965 | Kolyar et al. | 252/412 |
| 3,959,382 | 5/1976 | Yeh et al. | 502/25 |
| 4,164,481 | 8/1979 | Ma et al. | 252/412 |
| 4,190,554 | 2/1980 | Yamauchi et al. | 252/412 |
| 4,659,683 | 4/1987 | Buffar et al. | 502/24 |

FOREIGN PATENT DOCUMENTS

| 741020 | 4/1970 | Belgium | 423/387 |
| 0193889 | 2/1986 | European Pat. Off. . | |

*Primary Examiner*—Paul E. Konopka
*Attorney, Agent, or Firm*—Keil & Weinkauf

[57] ABSTRACT

A method of regenerating noble metal catalysyts used for the catalytic reduction of nitrogen oxide with hydrogen, wherein the noble metal catalyst is treated with an aqueous alkaline solution having a pH of more than 9.

1 Claim, No Drawings

METHOD OF REGENERATING INACTIVE AND POISONED PLATINUM CATALYSTS

The preparation of hydroxylammonium salts by catalytic reduction of nitrogen oxide with hydrogen in an acid medium and in contact with catalysts containing noble metals, particularly platinum, has been disclosed. When this process is carried out industrially, the activity, selectivity and useful life of the catalyst in use constitute important factors.

It is usual to carry out this process using a supported platinum catalyst, and this shows an appreciable loss of selectivity and activity after an on-stream period of some weeks. The catalyst must therefore be regenerated at intervals. The useful life of the catalyst, defined as the maximum on-stream time during which it can be in continuous use, is greatly affected by the regenerating method employed. DE-PS 1,088,037 describes a conventional method of regenration in acid medium and its influence on the subsequent on-stream period.

Despite periodical regeneration, a well-used catalyst will slowly lose its original catalytic properties; its selectivity declines and the useful life becomes progressively shorter. The necessity for more frequent regeneration is the result.

The cause of these long-term effects is chiefly the fact that the catalyst becomes progressively coated with deposits of metals having a poisonous effect thereon. These occur as the result of corrosion of the steel of the equipment and are transferred to the catalyst by the acidic reaction medium. It is possible to remove most of this metal coating with aqua regia, when regenerating the catalyst, but the greater part of the dissolved metals will be re-precipitated onto the catalyst support during subsequent reductive deposition of the platinum.

A method of solving this problem is proposed in EP-A 193,889, in which the undesirable metals are precipitated by the use of a selective precipitant and can thus be removed. This is, obviously, an additional process step.

It is thus an object of the present invention to provide a method of restoring the original catalytic properties of well-used supported noble metal catalysts employed in the synthesis of hydroxylammonium salts by catalytic reduction of nitrogen oxide with hydrogen in an aqueous mineral acid solution.

The present invention relates to a method of regenerating noble metal catalysts, by means of which the above drawbacks are avoided by subjecting the catalyst to treatment with an aqueous alkaline solution having a pH of more than 9.

The method is suitable, in principle, for use on all noble metal catalysts which are employed in hydroxylamine synthesis and catalyze the reduction of nitrogen oxide with hydrogen, but are particularly suitable for use on catalysts comprising platinum on a conventional support (e.g. graphite).

Such catalysts are well known to the person skilled in the art and are commercially available and, consequently, require no further description here.

Suitable aqueous alkaline solutions are, in principle, all solutions having a pH of more than 9, preferably more than 10. For economic reasons, it is preferred to use the hydroxides of alkali metals and alkaline earth metals and salts of such metals with weak acids, for example the carbonates. Particularly preferred are aqueous solutions of $NaOH$ and $Na_2CO_3$, since these are available in large quantities.

The concentration of the aqueous solutions is not critical, but it will generally lie between 1% w/w and the saturation point, preferably between 2 and 20% w/w.

The duration of the treatment of the catalyst and the temperature used depend on the concentration of the aqueous solution. In general, treatment must be prolonged or a higher temperature used when the concentration is reduced.

Generally speaking, the duration of treatment ranges from 1 minute to 12 hours and is preferably from 10 minutes to 3 hours, the temperature being from 15° to 100° C., preferably from 20° to 50° C. It is particularly preferred to operate at room temperature.

Following the treatment with aqueous alkaline solution, the latter is removed from the catalyst by washing with water or, in particular, with a dilute mineral acid, in which case the catalyst is subsequently washed with water to neutrality.

The regenerated catalyst thus obtained can be immediately re-used for the catalytic reduction of nitrogen oxide with hydrogen to form hydroxylamine.

In the method of the invention, there is no removal of noble metal, in particular platinum, from the support such as occurs in the conventional method of regeneration with acid solutions. There is therefore of course no longer any necessity to re-apply the noble metal to the support, which is a very distinct advantage.

The activity and selectivity properties of the catalysts regenerated by the method of the invention are at least equivalent to those of conventionally regenerated catalysts and are frequently better.

Below, all volumes relating to the gaseous state are based on a temperature of 0° C. and a pressure of 1,013 mbar.

EXAMPLE 1

500 g (dry substance) of a moist hydroxylamine catalyst (platinum metal on graphite) were placed in a stirred vessel and stirred at 25° C. for one hour, together with 800 g of 4% w/w caustic soda solution. The caustic soda solution was then filtered off through a glass filter funnel and the filter cake was washed twice with water and once with 10% w/w $H_2SO_4$ and then again with water to neutrality.

200 g (dry substance) of the catalyst thus treated were suspended in 5,000 ml of 20% w/w $H_2SO_4$, and the catalyst was then activated with hydrogen at 40° C.

250 l/h of a mixture of 66% v/v of $H_2$ (99.9% pure) and 34% v/v of NO (99.5% pure) were then passed through the said catalyst suspension. The reaction temperature was 40°–41° C.

After 1,380 liters of said $NO/H_2$ gas mixture had been passed through, there were obtained 5,350 ml of a solution having the following composition:
22.5 g/l of free $H_2SO_4$
104.8 g/l of $NH_2OH$ [as $(NH_3OH)_2SO_4$]
6.2 g/l of $NH_3$ [as $NH_4HSO_4$]

The total amount of off-gas was 258 l and the composition thereof was as follows:
79.5% v/v of $H_2$
18.3% v/v of NO
2.2% v/v of $N_2O$ The selectivity and space-time yield calculated from the results were as follows:

Selectivity 87.4% for $NH_2OH$
10.0% for $NH_3$
2.6% for $N_2O$

Space-Time Yields 0.691 mole/$l_{RR^{fl}}$/h, based on NO conversion
0.604 mole/$l_{RR^{fl}}$/h, based on $NH_2OH$ formed.

[The above dimension $RR^{fl}$ refers to the volume of the liquid reaction solution. Since this volume increased during the reaction (5,000→5,350 ml), an average value was used for the calculation.]

Comparative Example 640 g (dry substance) of a well-used hydroxylamine catalyst as used in Example 1 were suspended in 500 ml of water and 100 ml of aqua regia (a mixture of concentrated hydrochloric acid and concentrated nitric acid) and stirred overnight at 80° C. The next day, the suspension was diluted with 400 ml of water, cooled to 30° C. and adjusted to a pH of 3.0 with soda, after which the solution was buffered with sodium acetate. A solution of $Na_2S_2O_4$ was added until $Pt^{4+}$ was reduced to $Pt^{2+}$, and the resulting Pt was then re-precipitated onto the graphite support by means of 100 ml of 99% w/w HCOOH.

200 g (dry substance) of the catalyst thus treated were suspended in 5,000 ml of 20% w/w $H_2SO_4$, and the catalyst was activated with $H_2$ at 40° C. 274 l/h of a mixture of 66% v/v of $H_2$ (99.9% pure) and 34% v/v of NO (99.5% pure) were then passed through the said catalyst suspension.

After 1,348 liters of said $NO/H_2$ gas mixture had been passed through, there were obtained 5,290 ml of a solution having the following composition:
24.7 g/l of free $H_2SO_4$
96.5 g/l of $NH_2OH$ [as $(NH_3OH)_2SO_4$]
8.9 g/l of $NH_3$ [as $NH_4HSO_4$]

The total amount of off-gas was 274 l and the composition thereof was as follows:
78.1% v/v of $H_2$
19.2% v/v of NO
2.7% v/v of $N_2O$ Selectivities and space-time yields calculated from the results were as follows:

Selectivity 81.9% for $NH_2OH$
14.7% for $NH_3$
3.4% for $N_2O$

Space-time Yield 0.593 mole/$lRR^{fl}$/h, based on NO consumption
0.485 mole/$lRR^{fl}$/h, based on $NH_2OH$ formed.

We claim:
1. A method of regenerating of deactivated platinum-on-graphite catalysts, used for the manufacture of hydroxylammonium salts by the catalytic reduction of nitrogen oxide with hydrogen in aqueous mineral acids, which comprises: contacting the platinum-on-graphite catalyst with an aqueous solution containing from 2 to 20% by weight of alkali metal hydroxide and/or alkali metal carbonate, such solution having a pH of more than 9, at a temperature of from 15° to 100° C. for a period of from 10 to 300 minutes separating the platinum-on-graphite catalyst from the solution, and washing the regenerated catalyst with dilute mineral acid and with water.

* * * * *